(12) United States Patent
Zhong et al.

(10) Patent No.: US 11,496,054 B2
(45) Date of Patent: Nov. 8, 2022

(54) HIGH-GAIN QUASI-RESONANT DC-DC CONVERTER BASED ON VOLTAGE DOUBLING RECTIFIER CIRCUIT

(71) Applicant: Shandong University of Science and Technology, Shandong Province (CN)

(72) Inventors: Ningfan Zhong, Shandong Province (CN); Zhenhai Zhang, Shandong Province (CN); Jianbo Wei, Shandong Province (CN)

(73) Assignee: SHANDONG UNIVERSITY OF SCIENCE AND TECHNOLOGY, Shandong Province (CN)

( * ) Notice: Subject to any disclaimer, the term of this patent is extended or adjusted under 35 U.S.C. 154(b) by 0 days.

(21) Appl. No.: 17/624,897

(22) PCT Filed: Apr. 28, 2020

(86) PCT No.: PCT/CN2020/087379
§ 371 (c)(1),
(2) Date: Jan. 5, 2022

(87) PCT Pub. No.: WO2021/103415
PCT Pub. Date: Jun. 3, 2021

(65) Prior Publication Data
US 2022/0209672 A1      Jun. 30, 2022

(30) Foreign Application Priority Data

Nov. 29, 2019   (CN) .......................... 201911196086.9

(51) Int. Cl.
*H02M 3/335*   (2006.01)
*H02M 1/00*    (2006.01)
*H02M 3/00*    (2006.01)

(52) U.S. Cl.
CPC ......... *H02M 3/335* (2013.01); *H02M 1/0058* (2021.05); *H02M 3/01* (2021.05)

(58) Field of Classification Search
CPC .............................. H02M 1/0058; H02M 3/01
See application file for complete search history.

(56) References Cited

U.S. PATENT DOCUMENTS

| | | | |
|---|---|---|---|
| 4,823,249 A * | 4/1989 | Garcia, II ........... | H02M 3/3376 363/126 |
| 2002/0044461 A1* | 4/2002 | Jang .................. | H02M 3/33569 363/17 |

(Continued)

FOREIGN PATENT DOCUMENTS

| | | |
|---|---|---|
| CN | 1960149 | 5/2007 |
| CN | 103280995 | 9/2013 |

(Continued)

OTHER PUBLICATIONS

Kajanan Kanathipan, John Lam, A High-Gain, Soft-switched PV Micro-Converter Using a Single Switch with A Low Switch-Voltage-to-Output-Bus-Voltage Ratio, 2019, IEE (Year: 2019).*

(Continued)

*Primary Examiner* — Gustavo A Rosario-Benitez
(74) *Attorney, Agent, or Firm* — Christopher A. Proskey; BrownWinick Law Firm

(57) ABSTRACT

The present invention relates to the technical field of high-gain DC-DC converters, and disclosed is a high-gain quasi-resonant DC-DC converter based on a voltage doubling rectifier circuit. On the basis of a half-bridge quasi-resonant high-gain circuit topology and by combining a bidirectional positive and negative voltage doubling rectifier circuit, the present invention provides a high-gain DC-DC converter. The converter can further improve output voltage gain and reduce output voltage ripples, and can improve the system efficiency while reducing the number of turns of a high- (Continued)

frequency transformer; moreover, the converter can achieve soft-switching control, thereby having the advantages of low voltage and current stress, high efficiency, and the like.

5 Claims, 11 Drawing Sheets

(56) References Cited

U.S. PATENT DOCUMENTS

| | | | | |
|---|---|---|---|---|
| 2005/0041439 | A1* | 2/2005 | Jang | H02M 3/33573 363/17 |
| 2005/0068792 | A1* | 3/2005 | Yasumura | H02M 3/33592 363/21.06 |
| 2005/0281059 | A1* | 12/2005 | Yasumura | H02M 1/4241 363/16 |
| 2007/0076443 | A1* | 4/2007 | Yasumura | H02M 3/33569 363/16 |
| 2010/0254163 | A1* | 10/2010 | Martini | H05B 45/39 363/17 |
| 2014/0104893 | A1* | 4/2014 | Pan | H02M 3/01 363/21.02 |
| 2015/0162840 | A1* | 6/2015 | Frost | H02M 3/01 363/21.02 |
| 2017/0126136 | A1* | 5/2017 | Nakahori | H02M 3/3376 |
| 2017/0272052 | A1 | 9/2017 | Lin et al. | |
| 2019/0222129 | A1* | 7/2019 | Wang | H02M 3/01 |

FOREIGN PATENT DOCUMENTS

| | | |
|---|---|---|
| CN | 107171576 | 9/2017 |
| CN | 108233720 | 6/2018 |
| CN | 2018102969754 | 8/2018 |
| CN | 110365219 | 10/2019 |
| CN | 110932557 | 3/2020 |

OTHER PUBLICATIONS

International Search Report PCT/CN2020/087379 dated Aug. 12, 2020.

* cited by examiner

HIGH-GAIN QUASI-RESONANT DC-DC CONVERTER BASED ON VOLTAGE DOUBLING RECTIFIER CIRCUIT

CROSS REFERENCE TO RELATED APPLICATION(S)

This patent application is a 371 filing of International Application No. PCT/CN2020/087379 titled "High-gain quasi-resonance dc-dc converter based on voltage doubling rectifier circuit" which was filed on Apr. 28, 2020, which claims the benefit and priority of Chinese Patent Application No. 201911196086.9 filed on Nov. 29, 2019, the disclosure of each of which is incorporated by reference herein in its entirety as part of the present application.

TECHNICAL FIELD

The present disclosure relates to the technical field of high-gain DC-DC converters, and in particular to a high-gain quasi-resonant DC-DC converter based on a voltage doubling rectifier circuit.

BACKGROUND ART

In the wake of the global climate change and energy crisis, the distributed new energy generation technology has been developed rapidly. A high-gain DC-DC converter plays an important role in the connection between a distributed power supply and a power grid. The output voltage in common solar power generation is 24V, which is, via a high-gain DC-DC converter, raised to 380V to be connected to a direct current (DC) bus of a power system. Therefore, a high-gain DC-DC converter is required to have such functions as a great boosting turns ratio and high efficiency.

In order to achieve high-gain and high-efficiency converters, the research on high-gain converters at home and abroad is primarily focused on isolated high-gain DC-DC converters and non-isolated high-gain DC-DC converters.

According to recent research on non-isolated high-gain DC-DC converters, a traditional Boost circuit is replaced by a quasi-Z-source structure, which achieves a significant high-gain effect with a small duty ratio and low switching tube voltage stress. However, the large inductance and capacitance are not conducive to the miniaturization of the switching power supply, and besides, the hard switching mode leads to high switching loss under a high switching frequency. Proposed is a quadratic Boost converter composed of two or N cascaded Boost circuits, which is further optimized on the basis of the existing Boost converters. This topology effectively increases the voltage gain of the converter, and broadens the scope of input voltage, making it suitable for renewable energy applications in, for example, photovoltaic and fuel cells power generation. However, the increment of the number of cascaded converters leads to higher complexity of circuit and an increasing number of circuit components, which is not conducive to the miniaturization and integration of converters adding to the difficulty of closed-loop controller design. Based on the boost circuit, a single quasi-resonant circuit and a modularized switched capacitor are added, thus the switching tube current stress and output voltage gain of the converter are increased by using a small resonant inductor, and the switching tubes can be switched on and off in soft switching mode, which largely reduces the switching loss. The output voltage gain is directly proportional to the number of switched capacitors, which also brings about some problems in converters, such as increased cycle energy and decreased efficiency due to the excessive number of diodes. It is proposed to add a passive energy recovery buffer to the boost circuit. The passive energy recovery buffer consists of two fast recovery diodes, a resonant capacitor and a resonant inductor. Such passive buffer consumes little power and merely attenuates voltage spike while cannot completely eliminate the spike.

As regards the isolated DC-DC converter, the inductor and capacitor of the proposed half-bridge DC-DC converter resonate when switching tubes are switched on. One switching tube is switched on at zero current and switched off at zero voltage, another switching tube is switched on and off at zero voltage. Although reducing the switching loss, the soft switching of the two switching tubes needs switching frequency control, which increases the difficulty in designing closed-loop controllers and filters. The proposed boost current-fed push-pull quasi-resonant converter retains the inherent advantages of low input current stress and high voltage conversion ratio of conventional current-fed push-pull converters while realizes soft-switching under a low load, thereby improving the overall system efficiency. In addition, compared with active clamp current-fed push-pull converters and current-fed push-pull resonance converters, similar characteristics can be attained by using fewer components, which not only reduces the cost, but also improves the system reliability. A high-gain quasi-resonant current feedback DC-DC converter is proposed with characteristics such as a quasi-resonant current fed structure, zero magnetization direct-current bias and low input current ripples. By using the active clamping circuit, a switching tube is switched on at zero voltage and an output diode is switched off at zero current, thereby improving the overall efficiency of the converter. A voltage doubling rectifier is used in an output circuit to provide a higher voltage conversion ratio, such that the high frequency transformer can have a small turns ratio.

SUMMARY

The objective of the present disclosure is to put forward a high-gain quasi-resonant DC-DC converter based on a voltage doubling rectifier circuit. On the basis of a half-bridge quasi-resonant high-gain circuit topology and by combining a bidirectional voltage doubling rectifier circuit, the converter has a low voltage and current stress and high efficiency while maintaining the quasi-resonant operating characteristics and can further improve the voltage gain and reduce an output voltage ripple.

The present disclosure specifically adopts the following technical solutions:

a high-gain quasi-resonant DC-DC converter based on a voltage doubling rectifier circuit, including a booster circuit, a clamping circuit, a series resonance loop and a bidirectional positive and negative voltage doubling rectifier circuit;

where the booster circuit includes a first power switching tube and an input inductor connected in parallel, and a first anti-parallel diode is connected in parallel to the first power switching tube;

the clamping circuit includes a second power switching tube and a second capacitor connected in parallel, and a second anti-parallel diode is connected in parallel to the second power switching tube;

the series resonance loop includes a leakage inductance inductor and a first capacitor; and the bidirectional positive and negative voltage doubling rectifier circuit includes a first diode, a second diode, a third diode, a fourth diode, a first output capacitor, a second output capacitor, a third output capacitor, a fourth output capacitor and a load resistor.

Preferably, when a switch-on control signal is applied to the first power switching tube, the second power switching tube is controlled to be switched off, the first anti-parallel diode is switched on, current and voltage resonance occurs in the series resonance loop, and an alternating current and voltage are generated in a primary coil winding of a high frequency transformer; a first-stage voltage boost is realized on a secondary coil winding side of the high frequency transformer; at the same time, a second output diode and a third output diode, and a first output diode and a fourth output diode connected to the secondary coil winding are switched on in turn in a positive half-cycle and negative half-cycle of an alternating-current (AC), so as to complete AC voltage doubling rectification on the secondary coil winding side of the transformer, and thus achieve a voltage boost on the secondary coil winding side on the basis of a voltage boost on a primary coil winding side; finally, a high-gain voltage boost direct current is obtained on a load, the first power switch tube is then switched on at zero voltage, a direct-current power supply charges the input inductor, and currents of other branches are zero; the third output capacitor and the fourth output capacitor maintain a load supply current; and when a switch-on control signal is applied to the second power switching tube, the first power switching tube is controlled to be switched off; first, the second anti-parallel diode is switched on, an input current charges the second capacitor through the second anti-parallel diode, when the voltage of the capacitor is higher than a voltage of the power supply, the second power switching tube is switched on at zero voltage, and the second capacitor discharges, and charges the leakage inductance inductor in series and the first capacitor to store energy for a next stage of series resonance.

In an embodiment, duty ratios of the first power switching tube and the second power switching tube are D and 1-D, respectively.

In an embodiment, a resonant capacitor is adopted as the first capacitor.

In an embodiment, the circle number of the primary coil winding of the converter is N1, the circle number of the secondary coil winding of the converter is N2, and the turns ratio of the converter is n=$N_2/N_1$.

In an embodiment, during a stable operation, a converter switching cycle includes six operating modes:

operating mode 1: at time $t_0$, the second power switching tube is switched off, and a current difference between a leakage inductance current $i_{Lk}$ and an input inductor current $i_{LB}$ passes through the first anti-parallel diode of the first power switching tube, the first power switching tube is switched on at zero voltage, and a current in the first anti-parallel diode of the first power switching tube is zero;

operating mode 2: at time $t_1$, a direction of the current in the first power switching tube is changed, an input power supply charges the input inductor through the first power switching tube, a primary coil winding, the first capacitor and the leakage inductance inductor constitute the series resonance loop, the second diode and the third diode of an output circuit are switched on, a voltage of the secondary coil winding is converted to that of the primary coil winding as $u_o/n$, under a combined action of the voltage converted to the primary coil winding from the secondary coil winding and the first capacitance, the leakage inductance current $i_{Lk}$ is gradually decreased to zero, and a mathematical model of the circuit in this mode is shown as Equation (1), $$\begin{bmatrix} \dfrac{di_{Lk}}{dt} \\ \dfrac{du_{C1}}{dt} \end{bmatrix} = \begin{bmatrix} 0 & -\dfrac{1}{L_k} \\ \dfrac{1}{C_1} & 0 \end{bmatrix} \begin{bmatrix} i_{Lk}(t) \\ u_{C1}(t) \end{bmatrix} + \begin{bmatrix} -\dfrac{1}{L_k} \\ 0 \end{bmatrix} \begin{bmatrix} \dfrac{u_o}{n} \\ 0 \end{bmatrix}; \quad (1)$$

operating mode 3: at time $t_2$, the leakage inductance inductor and the first capacitor resonate, the direction of the leakage inductance current $i_{Lk}$ changes, the direction of primary side current changes, followed by a change in the direction of a secondary side current of the transformer, such that the second diode and the third diode are switched off, and the first diode and the fourth diode are switched on, a voltage doubling rectifier circuit of the output circuit continues to charge a load, and a sum of a voltage on the first output capacitor and a voltage on the fourth output capacitor is still $u_o/n$ after being converted to the primary side, Equations for calculating the primary side current and voltage of the transformer are as follows:

$$i_{Lk}(t) = \dfrac{u_o/n - u_{C1}(t_0)}{\sqrt{L_k/C_1}} \sin w_r(t-t_2) \quad (2)$$

$$u_{C1}(t) = u_{C1}(t_0)\cos w_r(t-t_2) \quad (3)$$

where $U_{C1}$ represents a voltage of the first capacitor, $w_r$ represents a resonance frequency, and $w_r=1/\sqrt{L_k C_1}$;

operating mode 4: at time $t_3$, the leakage inductance current $i_{Lk}$ resonates to zero and the converter enters a switch-off state, where during this stage, a power supply keeps charging the input inductor $L_B$ such that the input inductor current $i_{LB}$ remains constant, a current in the output circuit is zero, all the diodes $D_1$-$D_4$ are switched off, the output capacitors $C_{o2}$ and $C_{o4}$ directly supply power to the load, and the $i_{Lk}$:leakage inductance current of the high-frequency transformer at this stage can be obtained as:

$$i_{Lk}(t)=0 \quad (4)$$

where a sum of a voltage of a primary winding of the transformer and the voltage of the capacitor $C_1$ is $U_N$, and the principle of volt-second balance is applied as:

$$d_1 U_1 + d_3 U_3 = d_2 U_2 \quad (5)$$

$$U_2 = \dfrac{d_2 U_2 - d_3 U_1}{d_3} \quad (6)$$

in the Equations, $U_1$, $U_2$ and $U_3$ are sums of the voltage of the primary winding of the transformer and the voltage of the first capacitor in mode 1, mode 2 and mode 3, respectively;

operating mode 5: at time $t_4$, the first power switching tube is switched off, the current difference between an input current and a transformer current flows through the second anti-parallel diode of the second power switching tube, the second capacitor is discharged, the first capacitor is charged, a current flowing through the second power switching tube changes from negative to zero, a zero voltage switching condition is created such that the second power switching tube is switched on at zero voltage, a second output diode and a third output diode are switched on, a first output diode and a fourth output diode are switched off, and this phase ends when the current $i_{S2}$ through the second power switching tube reaches zero; and operating mode 6: at time $t_5$, a current of the second anti-parallel diode of the second power switching tube reaches zero, a direction of the current $i_{S2}$ flowing through the second power switching tube changes, the direction of the leakage inductance current $i_{Lk}$ remains unchanged and the leakage inductance current $i_{Lk}$ increases linearly, the second output diode and the third output diode are switched on, during time period $t_4$-$t_6$, the input inductor current flows through the primary winding of the transformer and charges the first capacitor all the time, and a mathematical model during this time period $t_4$-$t_6$ is shown as Equation (7):

$$\begin{bmatrix} \frac{di_{Lk}}{dt} \\ \frac{du_{C2}}{dt} \end{bmatrix} = \begin{bmatrix} 0 & \frac{1}{L_k} \\ \frac{1}{C_2} & 0 \end{bmatrix} \begin{bmatrix} i_{Lk}(t) \\ u_{C2}(t) \end{bmatrix} + \begin{bmatrix} -\frac{1}{L_k} & -\frac{1}{L_k} \\ & -\frac{1}{C_2} \end{bmatrix} \begin{bmatrix} \frac{u_o}{n} \\ i_{LB} \end{bmatrix}. \tag{7}$$

The present disclosure has the following beneficial effects.

Large inductance is adopted in an input circuit, which reduces input current ripples. The series resonance of a leakage inductance of a high-frequency transformer and a capacitor allows for a continuous voltage boost of the converter. The converter can achieve a high-gain voltage conversion, and meanwhile, the switching tube achieves soft switching, which significantly reduces system loss, and is particularly suitable for applications in distributed renewable energy power generation, electronic ballasts, and the like.

DETAILED DESCRIPTION OF THE EMBODIMENTS

The specific implementations of the present disclosure will be further described below with reference to the accompanying drawings and specific examples.

Figure 1:
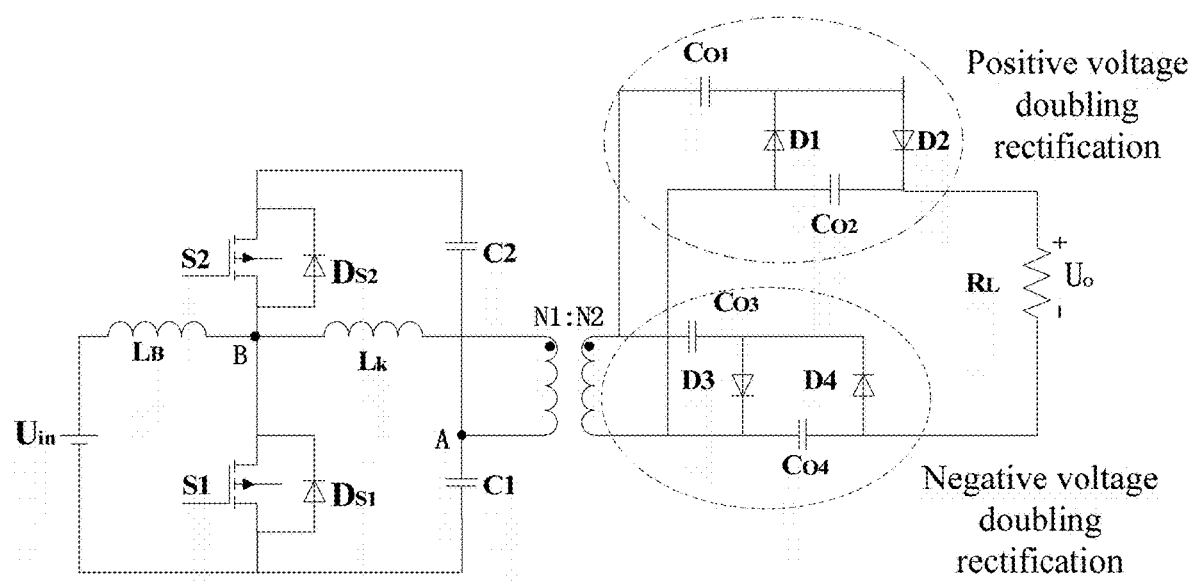
FIG. 1 shows a topology of a high-gain quasi-resonant DC-DC converter.
Figure 2:
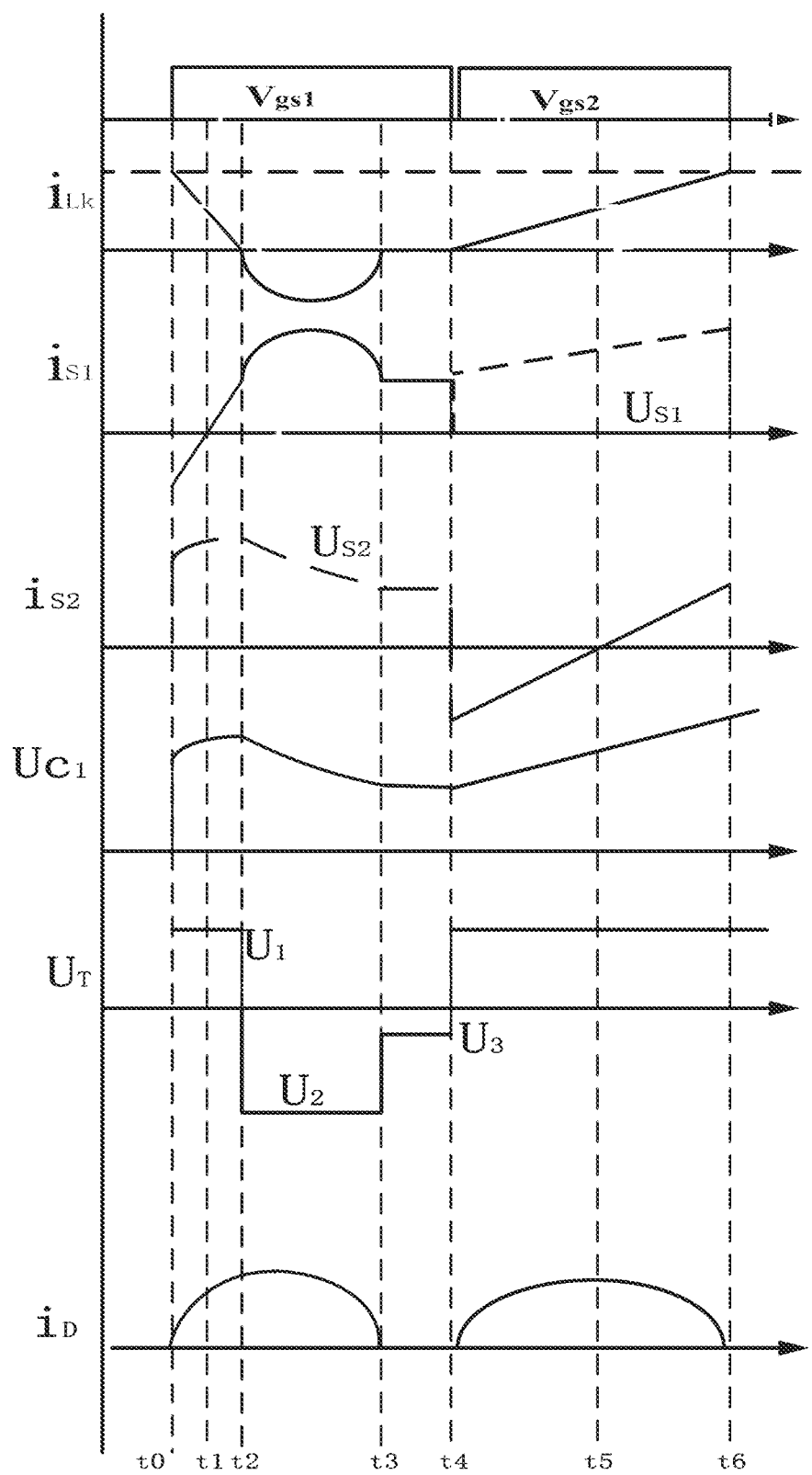
FIG. 2 shows a schematic diagram illustrating main operating waveforms of a high-gain quasi-resonant DC-DC converter.

As shown in FIGS. 1 and 2, a high-gain quasi-resonant DC-DC converter based on a voltage doubling rectifier circuit includes a booster circuit, a clamping circuit, a series resonance loop and a bidirectional positive and negative voltage doubling rectifier circuit:

where the booster circuit includes a first power switching tube $S_1$ and an input inductor $L_B$ connected in parallel, and a first anti-parallel diode $D_{s1}$ is connected in parallel to the first power switching tube and the clamping circuit includes a second power switching tube $S_2$ and a second capacitor $C_2$ connected in parallel, and a second anti-parallel diode $D_{s2}$ connected in parallel to the second power switching tube $S_2$; and duty ratios of the first power switching tube $S_1$ and the second power switching tube $S_2$ are D and 1-D, respectively.

The series resonance loop includes a leakage inductance inductor $L_k$ and a first capacitor $C_1$, and a resonant capacitor is adopted as the first capacitor $C_1$.

The bidirectional positive and negative voltage doubling rectifier circuit includes a first output diode $D_1$, a second output diode $D_2$, a third output diode $D_3$, a fourth output diode $D_4$, a first output capacitor $C_{o1}$, a second output capacitor $C_{o2}$, a third output capacitor $C_{o3}$, a fourth output capacitor $C_{o4}$ and a load resistor $R_L$.

A primary coil winding of the converter is N1, a secondary coil winding of the converter is N2, and a turns ratio of the converter is $n=N_1/N_1$.

When a switch-on control signal is applied to the first power switching tube, the second power switching tube is controlled to be switched off, the first anti-parallel diode is switched on, current and voltage resonance occurs in the series resonance loop, and an alternating current and voltage are generated in a primary coil winding; a first-stage voltage boost is completed on a secondary coil winding side by a high frequency transformer; a second output diode and a third output diode, and a first output diode and a fourth output diode in the secondary coil winding are switched on at the same time in turn during a positive half-cycle and negative half-cycle of an alternating-current (AC), so as to complete AC voltage doubling rectification on the secondary coil winding side of the transformer, and thus achieves a voltage boost on the secondary coil winding side on the basis of a voltage boost on a primary coil winding side; finally, direct current with a high voltage gain is obtained on a circuit load, the first power switching tube is then switched on at zero voltage, a direct-current power supply charges the input inductor, and currents of other branches are zero; the third output capacitor and the fourth output capacitor maintain a load supply current; and when a switch-on control signal is applied to the second power switching tube, the first power switching tube is controlled to be switched off; first, the second anti-parallel diode is switched on, an input current charges the second capacitor through the second anti-parallel diode, when a voltage of the capacitor is higher than a voltage of the power supply, the second power switching tube is switched on at zero voltage, and the second capacitor discharges, and charges the leakage inductance inductor in series and the first capacitor to store energy for a next stage of series resonance.

The following assumptions are made prior to analysis.

(1) The input inductance $L_B$ is ideal and large enough, and the inductive current is approximately constant during a switching cycle.

(2) Diodes and MOSFET switching tubes are all ideal devices, of which on-resistance is ignored.

(3) Transformer is ideally linear, of which loss is ignored.

(4) A voltage doubling rectifier circuit has a zero voltage drop inside, and the output capacitance are exactly the same.

Figure 3A:
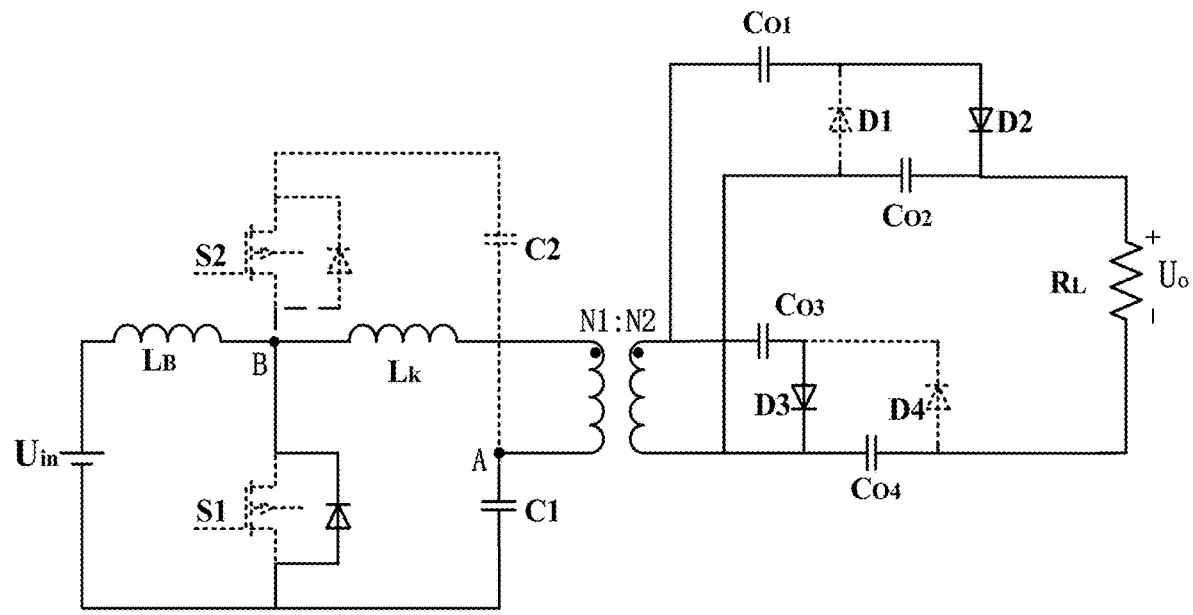
FIG. 3a shows an equivalent circuit diagram of a converter under an operating mode 1.
Figure 3B:
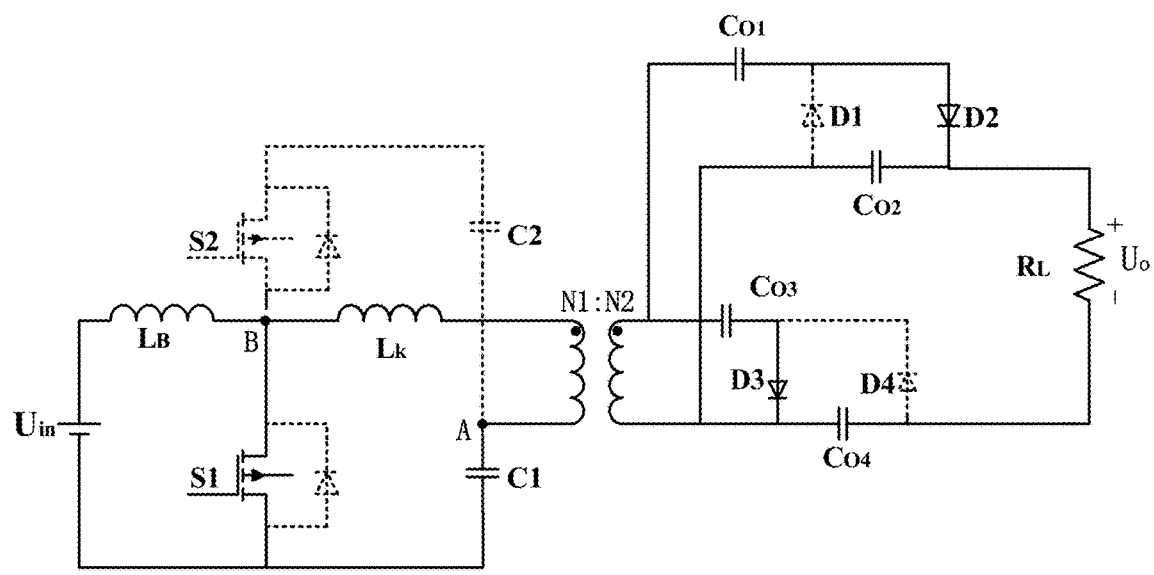
FIG. 3b shows an equivalent circuit diagram of a converter under an operating mode 2.
Figure 3C:
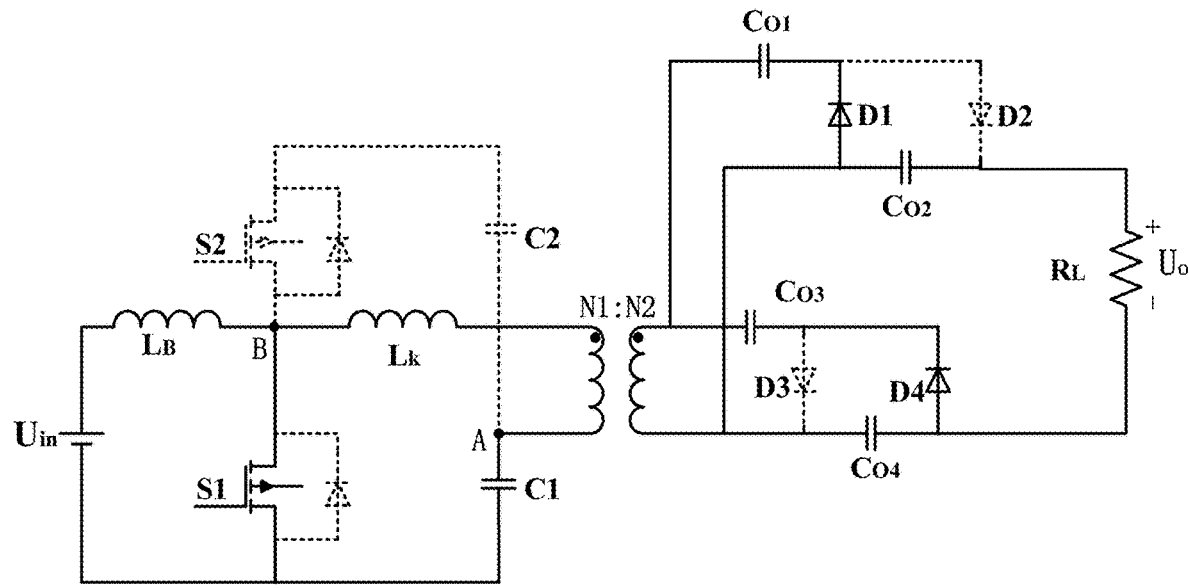
FIG. 3c shows an equivalent circuit diagram of a converter under an operating mode 3.
Figure 3D:
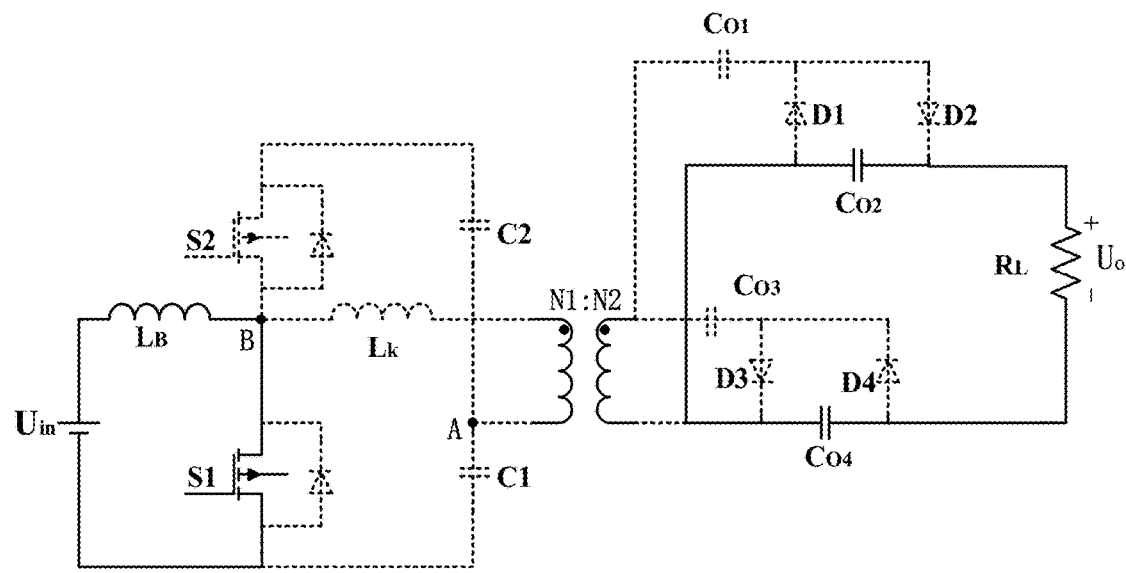
FIG. 3d shows an equivalent circuit diagram of a converter under an operating mode 4.
Figure 3E:
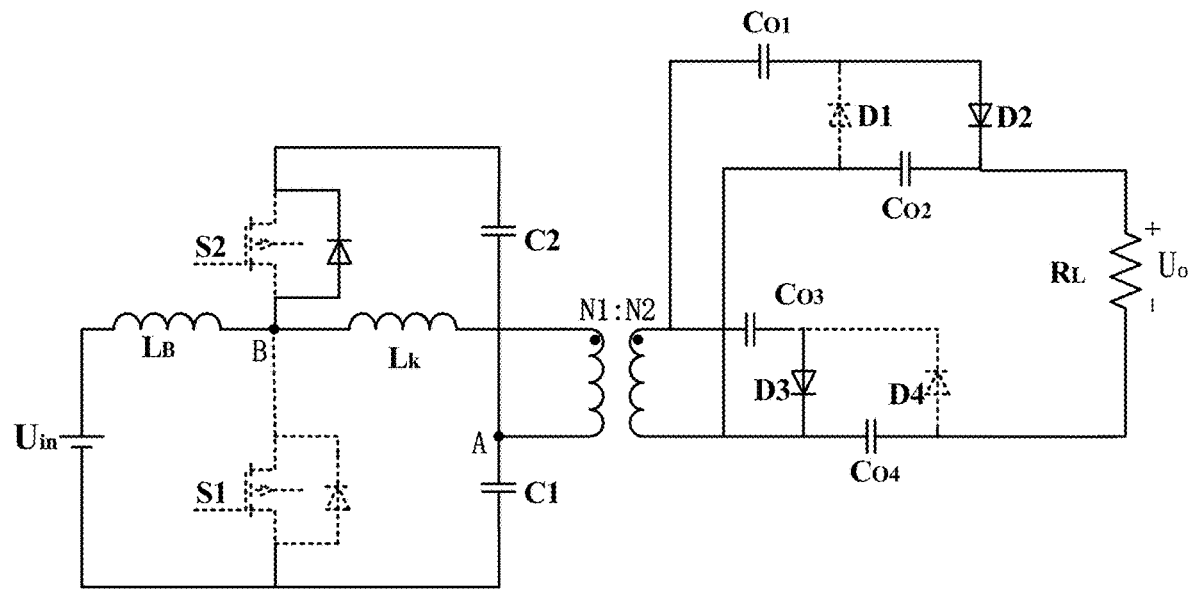
FIG. 3e shows an equivalent circuit diagram of a converter under an operating mode 5.
Figure 3F:
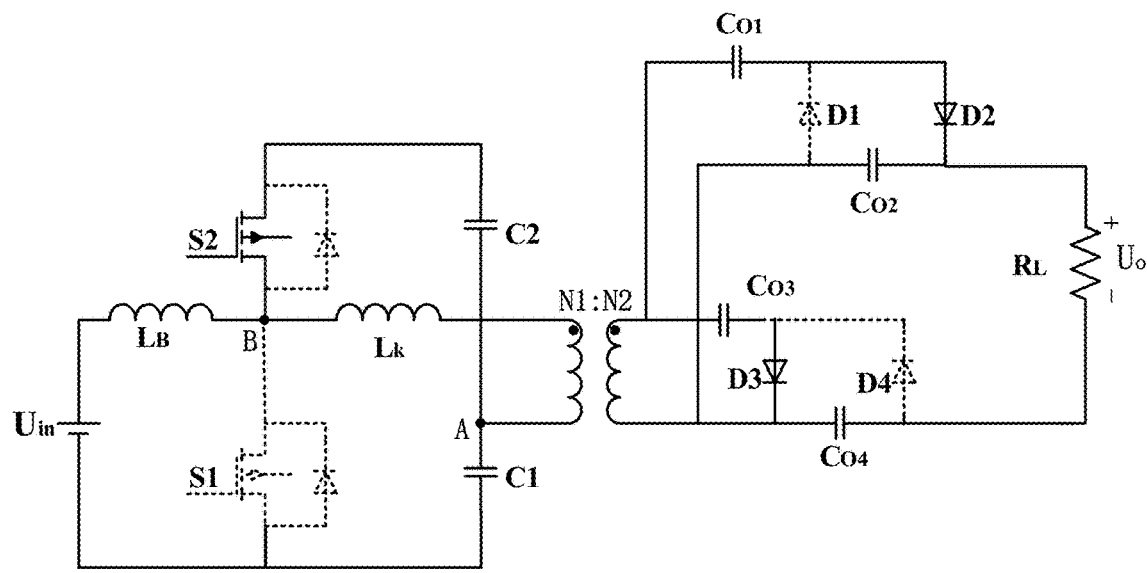
FIG. 3f shows an equivalent circuit diagram of a converter under an operating mode 6.

During a stable operation of a high-gain quasi-resonant DC-DC converter, main operating waveforms are shown in FIG. 2. The switching cycle includes six operating modes, as shown in FIGS. 3a-3f:

operating mode 1 [$t_0$-$t_1$]: as shown in FIG. 3a, at time $t_0$, the second power switching tube $S_2$ is switched off, and a difference between the leakage inductance current $i_{Lk}$ and the input inductor current $i_{LB}$ passes through the first anti-parallel diode $D_{s1}$ of the first power switching tube $S_1$, the first power switching tube $S_1$ is switched on at zero voltage, and the current in the first anti-parallel diode $D_{s1}$ is zero;

operating mode 2 [$t_1$-$t_2$]: as shown in FIG. 3b, at time $t_1$, a direction of the current in the first power switching tube $S_1$ is changed, an input power supply charges the input inductor $L_B$ through the first power switching tube $S_1$, a primary coil winding, the first capacitor and the leakage inductance inductor constitute the series resonance loop, the second output diode $D_2$ and the third diode $D_3$ of an output circuit are switched on, a voltage of the secondary coil winding is converted to that of the primary coil winding as $u_o/n$, under a combined action of the voltage converted to the primary coil winding from the secondary coil winding and the first capacitance, the leakage inductance current $i_{Lk}$ is gradually reduced to zero, and a mathematical model under this mode is shown as Equation (1), $$\begin{bmatrix} \frac{di_{Lk}}{dt} \\ \frac{du_{C1}}{dt} \end{bmatrix} = \begin{bmatrix} 0 & -\frac{1}{L_k} \\ \frac{1}{C_1} & 0 \end{bmatrix} \begin{bmatrix} i_{Lk}(t) \\ u_{C1}(t) \end{bmatrix} + \begin{bmatrix} -\frac{1}{L_k} \\ 0 \end{bmatrix} \begin{bmatrix} \frac{u_o}{n} \\ 0 \end{bmatrix}; \quad (1)$$

operating mode 3 [$t_2$-$t_3$]: as shown in FIG. 3c, at time $t_2$, the leakage inductance inductor $L_k$ and the first capacitor $C_1$ resonate, the direction of the leakage inductance current $i_{Lk}$ changes, the direction of primary current changes, followed by a change in a direction of a secondary current of the transformer, such that the second output diode $D_2$ and the third output diode $D_3$ are switched off, and the first output diode $D_1$ and the fourth output diode $D_4$ are switched on, a voltage doubling rectifier circuit of the output circuit continues to charge a load, and a sum of voltages on the first output capacitor $C_{o1}$ and the fourth output capacitor $C_{o4}$ is still $u_o/n$ after being converted to the primary side. Equations for calculating the primary current and voltage of the transformer are as follows:

$$i_{Lk}(t) = \frac{u_o/n - u_{C1}(t_0)}{\sqrt{L_k/C_1}} \sin w_r(t - t_2) \quad (2)$$

$$u_{C1}(t) = u_{C1}(t_0) \cos w_r(t - t_2) \quad (3)$$

where $U_{C1}$ represents a voltage of the first capacitor, $w_r$ represents resonance frequency, and $w_r = 1/\sqrt{L_k C_1}$;

operating mode 4 [$t_3$-$t_4$]: as shown in FIG. 3d, at time $t_3$, the leakage inductance current $i_{Lk}$ resonates to zero and the converter enters a switch-off state, where during this stage, a power supply keeps charging the input inductor $L_B$ such that the input inductor current $i_{LB}$ remains constant, current in the output circuit is zero, all the output diodes $D_1$-$D_4$ are switched off, the output capacitors $C_{o2}$ and $C_{o4}$ directly supply power to the load, and the leakage inductance current $i_{Lk}$ of the high-frequency transformer at this stage can be obtained as:

$$i_{Lk}(t) = 0 \quad (4)$$

a sum of a voltage of a primary winding of the transformer and the voltage of the first capacitor $C_1$ is $U_N$, and the principle of volt-second balance is applied:

$$d_1 U_1 + d_3 U_3 = d_2 U_2 \quad (5)$$

$$U_3 = \frac{d_2 U_2 - d_1 U_1}{d_3} \quad (6)$$

in the Equations, $U_1$, $U_2$ and $U_3$ are sums of the voltage of the primary winding of the transformer and the voltage of the first capacitor in mode 1, model 2 and mode 3, respectively;

operating mode 5 [$t_4$-$t_5$]: as shown in FIG. 3e, at time $t_4$, the first power switching tube $S_1$ is switched off, the current difference between an input current and a transformer current flows through the second anti-parallel diode $D_{s2}$, the second capacitor $C_2$ discharges, the first capacitor $C_1$ is charged, a current flowing through the second power switching tube $S_2$ changes from negative to zero, a zero voltage switch-on (ZVS) condition is created such that the second power switching tube $D_2$ is zero voltage switched on, a second output diode $D_2$ and a third output diode $D_3$ are switched on, a first output diode $D_1$ and a fourth output diode $D_4$ are switched off, and this phase ends when the current $i_{S2}$ of the second power switching tube reaches zero; and operating mode 6 [$t_5$-$t_6$]: as shown in FIG. 3f, at time $t_5$, a current of the second anti-parallel diode $D_{s2}$ reaches zero, a direction of the current $i_{S2}$ flowing through the second power switching tube $S_2$ changes, the direction of the leakage inductance current $i_{Lk}$ remains unchanged and the leakage inductance current $i_{Lk}$ increases linearly, the second output diode $D_2$ and the third output diode $D_3$ are switched on, during time period $t_4$-$t_6$, the input inductor current flows through the primary winding of the transformer and charges the first capacitor $C_1$ all the time, and a mathematical model during this time period $t_4$-$t_6$ is shown as Equation (7):

$$\begin{bmatrix} \frac{di_{Lk}}{dt} \\ \frac{du_{C2}}{dt} \end{bmatrix} = \begin{bmatrix} 0 & \frac{1}{L_k} \\ \frac{1}{C_2} & 0 \end{bmatrix} \begin{bmatrix} i_{Lk}(t) \\ u_{C2}(t) \end{bmatrix} + \begin{bmatrix} -\frac{1}{L_k} \\ -\frac{1}{C_2} \end{bmatrix} \begin{bmatrix} \frac{u_o}{n} \\ i_{LB} \end{bmatrix}. \quad (7)$$

Figure 4:
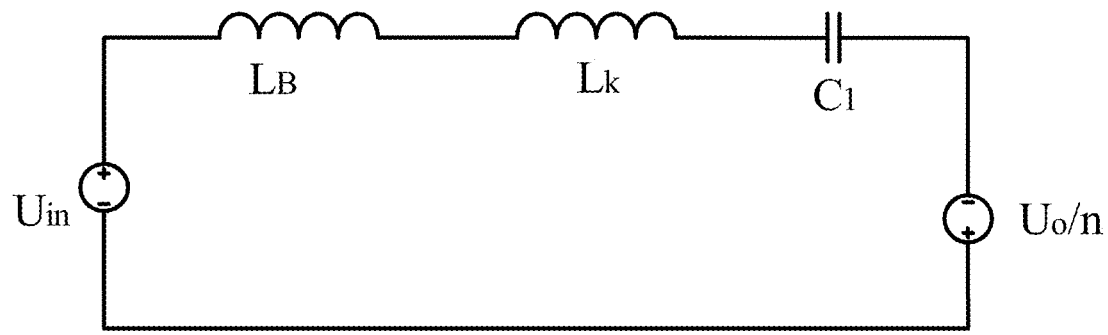
FIG. 4 shows an equivalent model diagram illustrating the high-gain topology steady state.

As shown in FIG. 1, the output voltage on the secondary side of the transformer is converted to the primary side, and the voltage on the inductor is zero in a steady state. An equivalent model diagram when the circuit is in a steady state is shown in FIG. 4.

The voltage on the inductor is zero in a steady state, and according to the Kirchhoff Voltage Law (KVL), it can be known that:

$$U_{in}+U_{C1}=U_c/n \quad (8)$$

The relationship between the voltage on the first capacitor $C_1$ and the input voltage when the circuit is in a steady state can be obtained by establishing a mathematical model:

$$U_{C1} = \frac{D}{(1-D)} U_{in} \quad (9)$$

As can be seen from Equations (8) and (9), an output voltage gain of an improved high-gain quasi-resonant DC-DC converter under an ideal condition can be obtained as:

$$M = \frac{n}{(1-D)}. \quad (10)$$

Figure 5:
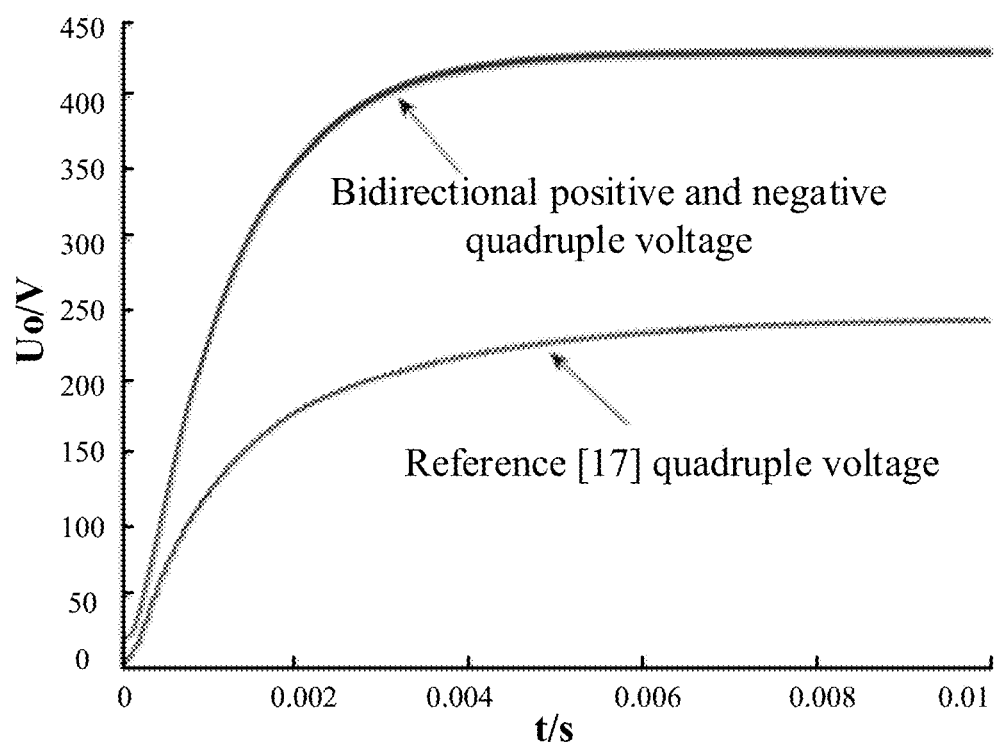
FIG. 5 shows a simulation comparison diagram illustrating output voltage gains.

Upon simulation comparison by MATLAB software, as shown in FIG. 5, it can be seen that with the same parameters, the high-gain quasi-resonant DC-DC converter has advantages of high voltage gain and fast dynamic response.

Figure 6:
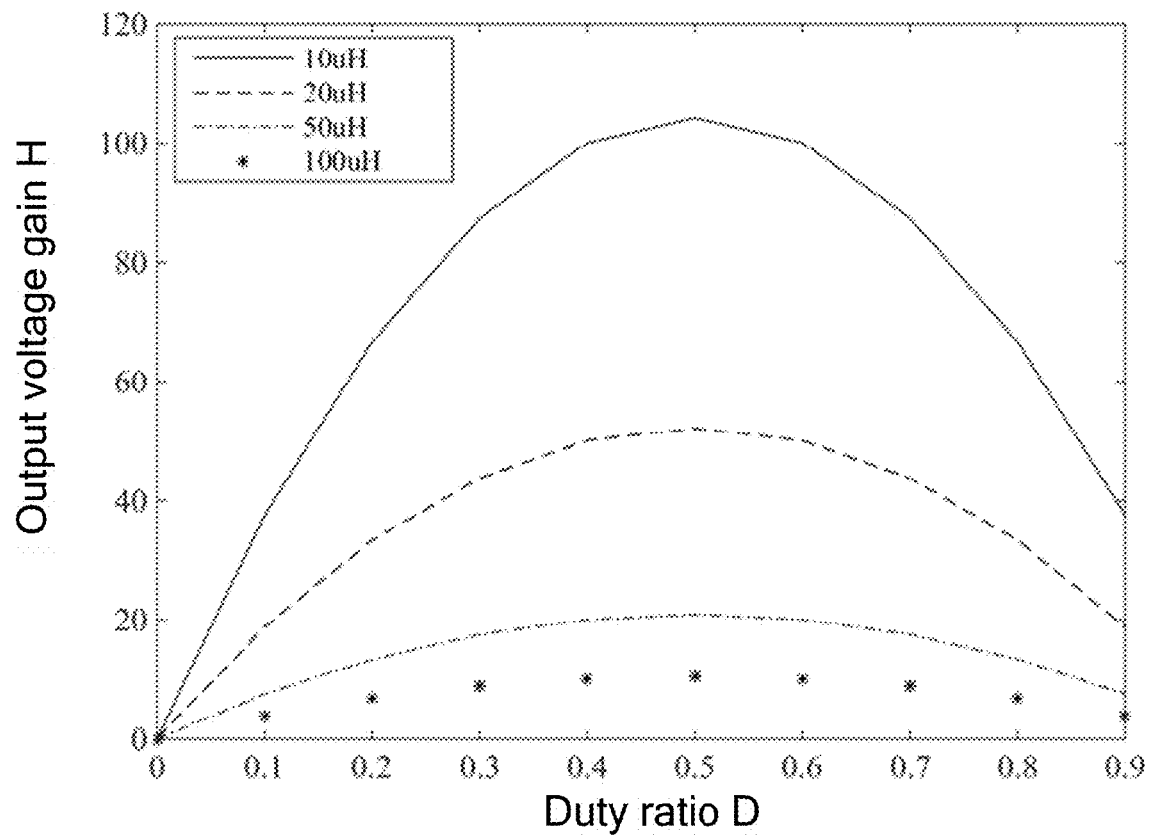
FIG. 6 shows a schematic relation diagram illustrating voltage gains M and duty ratios D under different leakage inductances.

With different values of leakage inductance $L_k$ of the high-frequency transformer considered, the relationship between the output voltage gain M and the duty ratio D can be obtained by using MATLAB simulation software, as shown in FIG. 6. As can be seen from the figure, when the duty ratio is D∈(0.1,0.5), the output voltage gain M and duty ratio D strictly increase monotonically; when the duty ratio is D∈(0.4,0.6), the maximum output voltage gain value is reached; under the same duty ratio, the smaller the value of leakage inductance $L_k$ of the transformer, the higher the output voltage gain, the better the voltage boost performance of the converter.

As shown in FIG. 3a, at time $t_0$, the second power switching tube $S_2$ is switched off, and the current difference between the input current and leakage current $i_{Lk}$ flows through the first anti-parallel diode $D_{s1}$ of the first power switching tube $S_1$. The input current, namely the current flowing through the input inductor $L_B$, from the point of view of energy exchange, needs to satisfy the following relationship:

$$\frac{1}{2}L_B(I_{LB})^2 = \frac{1}{2}L(I_{in})^2 > \frac{1}{2}C_s\left(\frac{U_m}{1-D}\right)^2 \quad (11)$$

In Equation (11), $I_{in}$ represents the average value of the input current, $I_{LB}$ is the current flowing through the input inductor $L_B$, and the capacitance $C_S$ is the sum of the parasitic capacitances of the first power switching tube $S_1$ and the second power switching tube $S_2$. The first power switching tube $S_1$ can realize ZVS conduction within a full load range, provided that Equation (11) is satisfied.

According to operating mode 5: at time $t_4$, the first power switching tube $S_1$ is switched off, input inductor current flows through the second anti-parallel diode $D_{s2}$ of the second power switching tube $S_2$, at the same time, a parasitic parallel capacitor of the first power switching tube $S_1$ is charged, and a parasitic parallel capacitor of the second power switching tube $S_2$ is discharged. Therefore, in order to realize the ZVS conduction condition of the second power switching tube $S_2$, the following KCL equation must be satisfied at point B:

$$i_{S2(t_4)}=i_{Lk(t_4)}-i_{in(t_4)}=I_{in} \quad (12)$$

In Equation (12), $i_{in}$ represents an instantaneous value of input current. At time $t_4$, the current through the second anti-parallel diode $D_{s2}$ is always $I_{in}$, which can prove that the second power switching tube $S_2$ can achieve ZVS conduction within the full load range.

To sum up, when the DC-DC converter simultaneously satisfies Equations (11) and (12), the two power switching tubes simultaneously achieve ZVS conduction, which will greatly reduce the loss of the switching tubes.

An output voltage ripple refers to the difference between the maximum output voltage and the minimum output voltage when the input changes. The output voltage ripple $\Delta U=U_{o,max}-U_{o,min}$ is an important index for the design of a high-gain DC-DC converter.

As shown in FIG. 1, a high-gain circuit output stage has a circuit structure with a bidirectional positive and negative voltage doubling rectifier circuit. According to the operating characteristics of the bidirectional positive and negative voltage doubling rectifier circuit, a formula of the output voltage ripples can be obtained:

$$\Delta U = \frac{I_o}{f_s C_o} \cdot \frac{k}{2} \quad (13)$$

In Equation (13), k represents an order of the bidirectional positive and negative voltage doubling rectifier circuit. According to Equation (13), the output voltage ripple is related to an output current, a switching frequency and an output capacitance, where the output voltage ripple is inversely proportional to the switching frequency and capacitance value, but directly proportional to the order of the voltage doubling rectifier circuit and the output current.

Figure 7A:
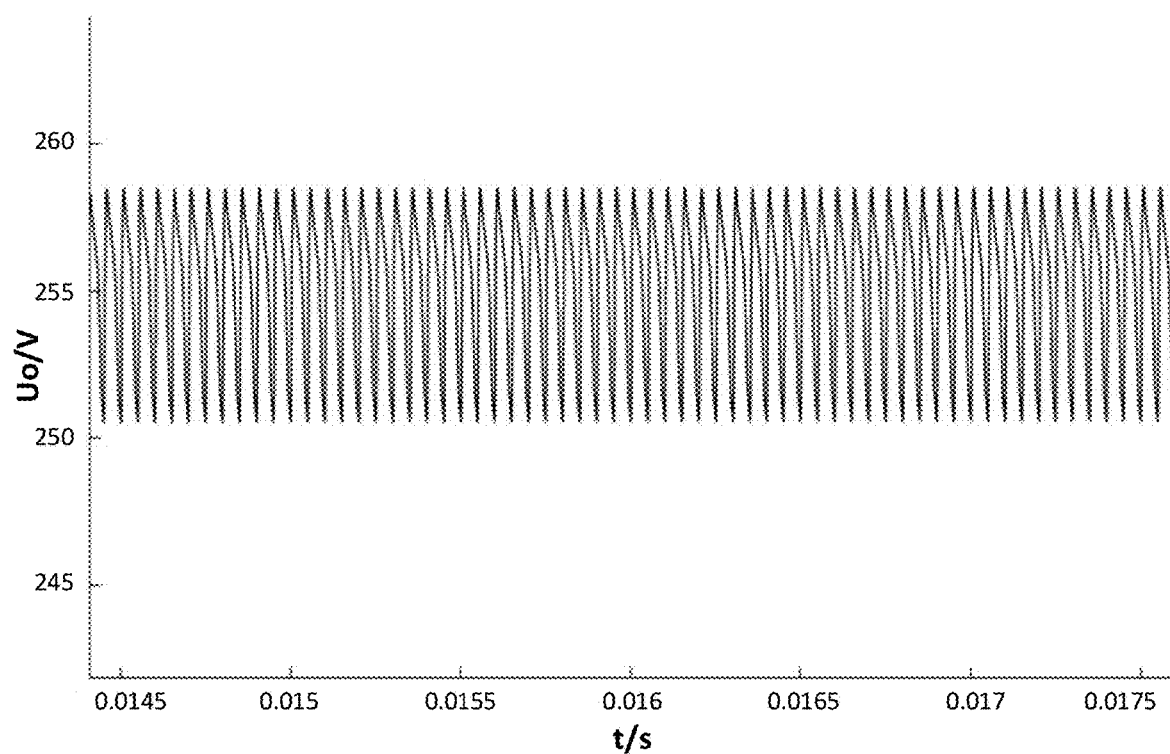
FIG. 7a shows a schematic diagram illustrating output voltage ripples of a traditional voltage-quadruple rectifier circuit.
Figure 7B:
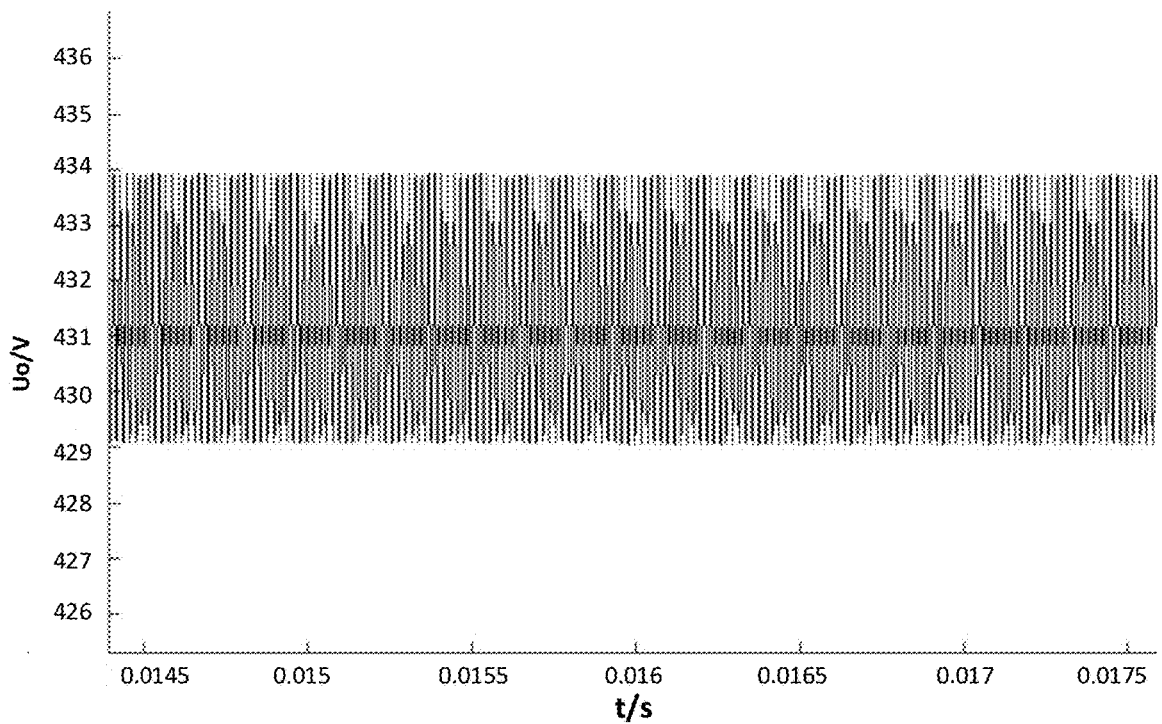
FIG. 7b shows a schematic diagram illustrating high-gain voltage-quadruple output voltage ripples of the converter.

FIGS. 7a and 7b show the comparison between output voltage ripple waveforms of the traditional voltage-quadruple high-gain topology and the high-gain topology proposed herein.

It can be seen from FIGS. 7a and 7b that with the same parameters, the high-gain converter proposed herein has an output voltage ripple waveform of 5V, and a ripple coefficient of 1.15%, which is far lower than the 3% as required for the ripple coefficient. However, the traditional voltage-quadruple high-gain topology has an output voltage waveform of 8V and a ripple coefficient of 4%.

Figure 8A:
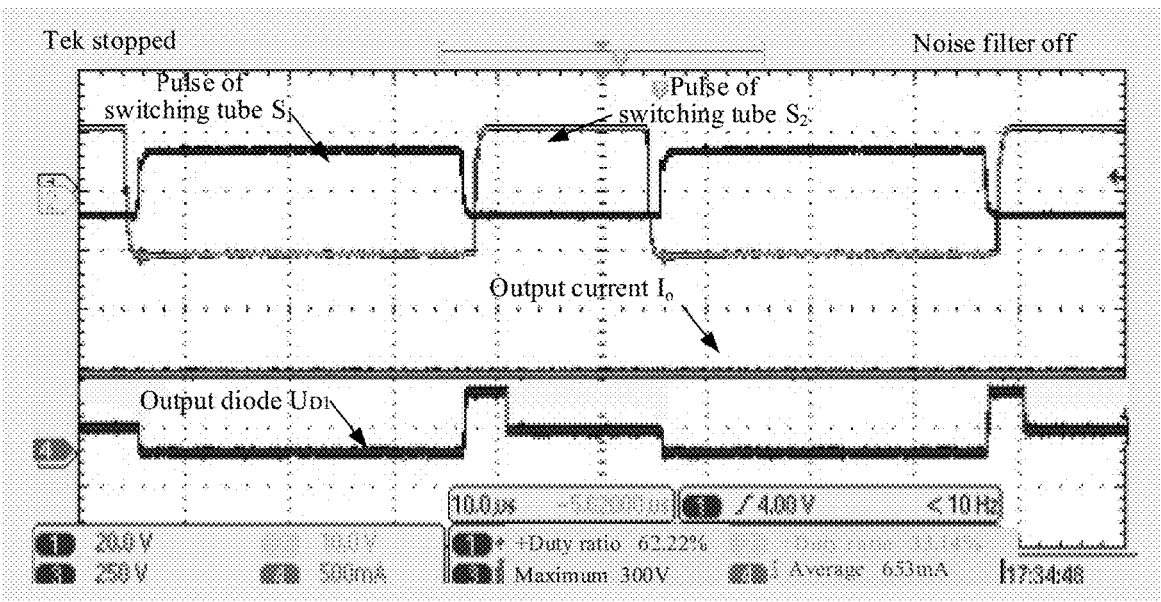
FIG. 8a shows a schematic diagram illustrating triggering pulse of a switching tube.
Figure 8B:
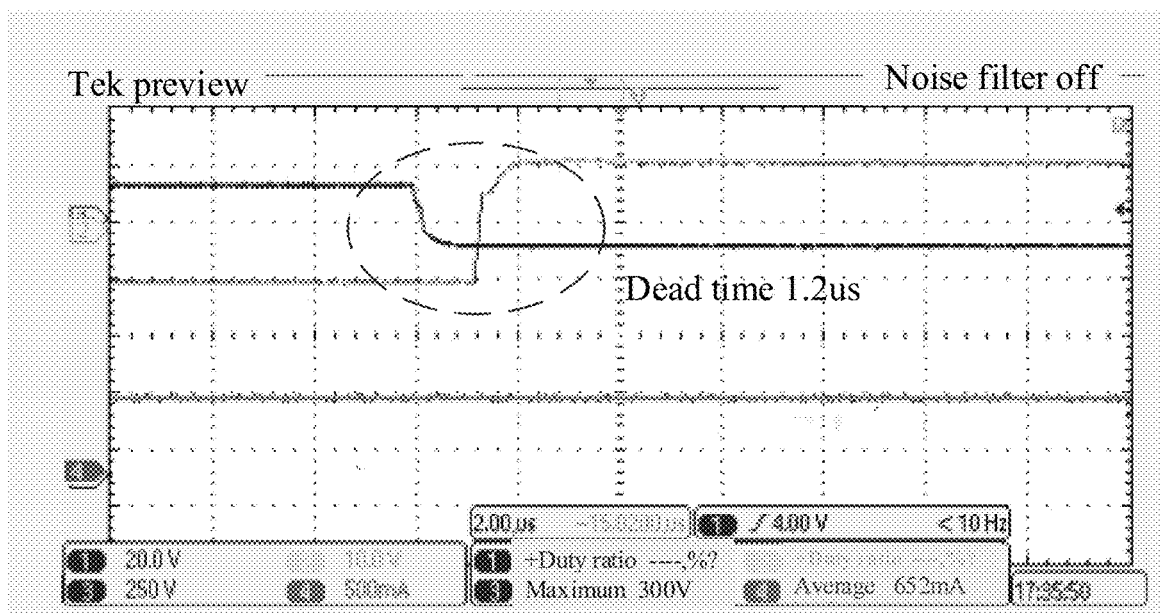
FIG. 8b shows a schematic diagram illustrating driving dead zone waveforms.

Driving waveforms of the switching tubes are shown in FIGS. 8a and 8b, the duty ratio of the first power switching tube $S_1$ is 62%, the duty ratio of the second power switching tube $S_2$ is 33%, and the two switching tubes have complementary driving waveforms. In order to avoid false triggering during inversions of control signals of the two switching tubes, a dead time is set during an experiment, and it can be seen from FIG. 8b that there is a dead time 1.2 μs between the two switching tubes.

When the input voltage is 24V, it can be seen from FIG. 8a that the output voltage can reach 290V in a steady state, which verifies that the improved topology has a good voltage boost performance and can better meet the requirements of a high-gain DC-DC converter.

Figure 9:
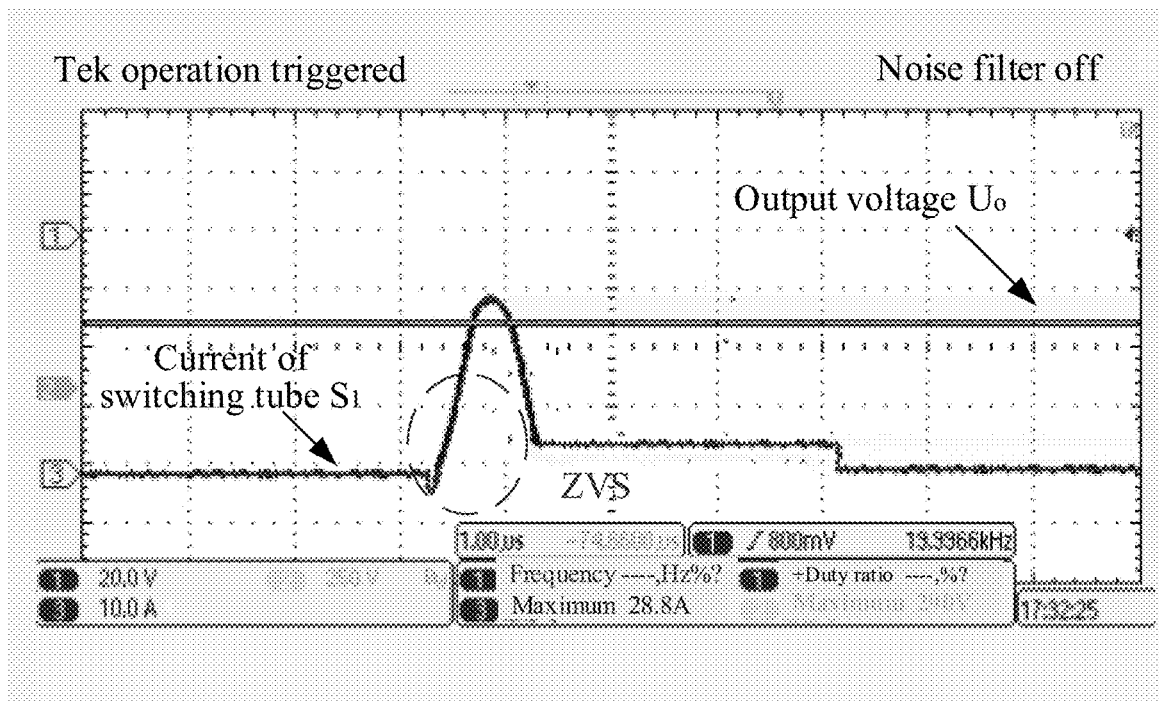
FIG. 9 shows a zero-voltage-switching diagram of a first power switching tube.

FIG. 9 shows a ZVS conduction diagram of the first power switching tube $S_1$. It can be seen that before the first power switching tube $S_1$ is switched on, the current flows through its first anti-parallel diode $D_{s1}$, and the current $i_{S1}$ changes from negative to zero, such that a condition under which the voltage of the first power switching tube $S_1$ is zero is created to enable the first power switching tube $S_1$ to achieve ZVS conduction, which is consistent with the theoretical analysis.

Figure 10:
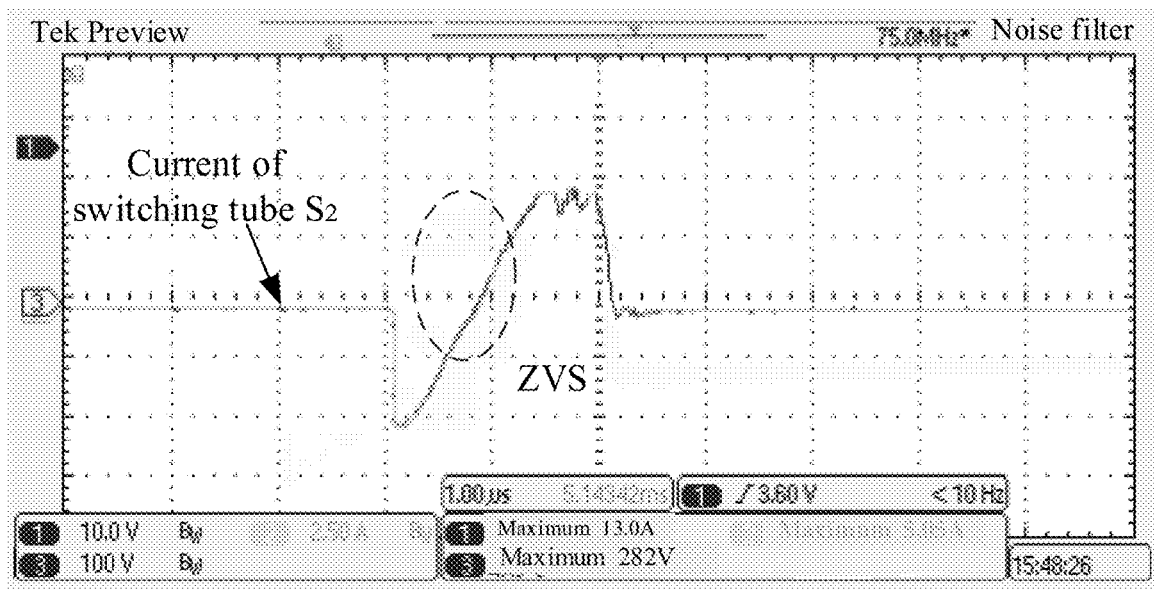
FIG. 10 shows a zero-voltage-switching diagram of a second power switching tube.

FIG. 10 shows a ZVS conduction diagram of the second power switching tube $S_2$. When the first power switching tube $S_1$ is switched off, a current difference between the input current $i_{LB}$ and the leakage inductance current $i_{Lk}$ flows through the second anti-parallel diode $D_{s2}$, and when the current flowing through the second power switching tube $S_2$ changes from negative to zero, the second power switching tube $S_2$ realizes ZVS conduction.

The loss of the high-gain DC-DC converter includes four parts: a loss of switching tubes, an on-state loss of output diodes, a copper loss and iron loss of the high-frequency transformer, where an expression of a total loss is as follows:

$$P_{loss} = P_S + P_{do} + P_{Cu} + P_{core}$$

When the load power is 170 W, the efficiency of the high-gain DC-DC converter is:

$$\eta_T = \frac{P_o}{P_o + P_{Loss}} = \frac{170}{170 + 19.18} = 89.9\%$$

Figure 11:
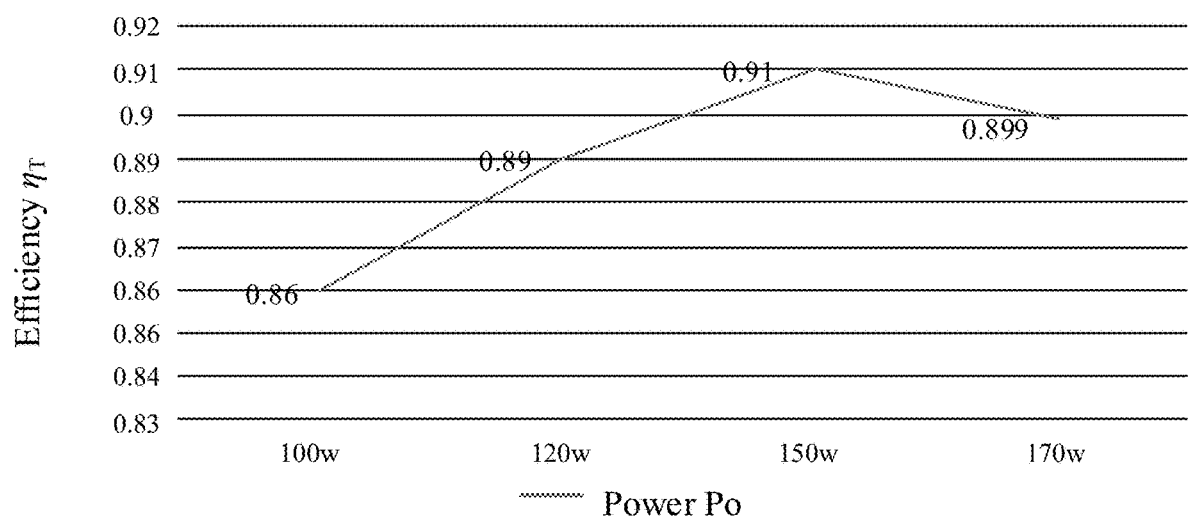
FIG. 11 shows an efficiency analysis diagram of a high-gain DC-DC converter.

FIG. 11 shows an efficiency analysis diagram of a high-gain DC-DC converter, where when input voltage is 24V, the load power $P_0$ is 100 W, 120 W, 150 W and 170 W, respectively. As can be seen from FIG. 11, when the load power is 100 W and 120 W, the high-gain DC-DC converter has a low efficiency, given that under low-power load, the loss of the high-frequency transformer and loss of the switching tubes in the high-gain DC-DC converter account for a high proportion, leading to a low power transmission efficiency of the high-gain DC-DC converter. When the load power is greater than or equal to 170 W, the effective value of current in the DC-DC converter is larger, which leads to a rapid increase of the on-state loss of switches and diodes, and lowers the efficiency of the DC-DC converter.

The loss of the high-frequency transformer accounts for the largest proportion of the loss of the whole converter, with a proportion of 57.6%; the more the number of turns of the transformer is, the greater the copper loss of the transformer is; the iron loss of the transformer is mainly related to the volume of the transformer; and the hard switch-off of the switching tube also brings about greater loss. Therefore, the following measures can be further taken to reduce the loss of the high-gain converter:

(1) reducing the number of turns of the transformer and increasing the order of the bidirectional positive and negative voltage doubling rectifier circuit to achieve a high gain;

(2) in consideration of a large ratio of magnetic dispersion loss in the transformer loss, reasonably reducing the transformer parameters, e.g., the transformer volume, and adopting a planar transformer or relatively thin copper foil to reduce the transformer iron loss and magnetic dispersion loss;

(3) for the loss of the MOSFET switching tubes, reducing the input current or using the switching tubes with a lower on-state loss to reduce the on-state losses of the switching tubes, for example, adopting novel switching tubes such as IPW60R045CPA;

(4) considering that with the increase of the order of voltage doubling rectifier circuit, the number of output diodes increases, adopting output diodes with a lower on-state resistance; and (5) since in a loss analysis, the energy storage element is regarded as an ideal element, and there is also loss of capacitance and inductance in the actual circuit, reducing the parasitic parameters of energy storage components such as capacitors and inductors when designing a hardware circuit.

On the basis of a half-bridge resonant high-gain circuit topology and by combining a bidirectional positive and negative voltage doubling rectifier circuit, a high-gain DC-DC converter is provided. The converter has the following advantages: the input current ripple is reduced by adopting large inductance in an input circuit; and the series resonance of a leakage inductance of a high-frequency transformer and a capacitor allows for continuous voltage boost of the converter. The converter can achieve a high-gain voltage conversion, and meanwhile, the switching tubes achieve soft switching, which significantly reduces system loss, and is particularly suitable for application in new-energy distributed power generation, electronic ballasts, and the like.

It should be noted that relational terms herein such as first and second are only used to distinguish one entity or operation from another entity or operation without necessarily requiring or implying any such actual relationship or order between such entities or operations.

It should be noted that the above description is not intended to limit the present disclosure, and the present disclosure is not limited to the above examples. Changes, modifications, additions or replacements made by those of ordinary skill in the art within the essential range of the present disclosure should fall within the protection scope of the present disclosure.

What is claimed is:

1. A high-gain quasi-resonant DC-DC converter based on a voltage doubling rectifier circuit, comprising a booster circuit, a clamping circuit, a series resonance loop, a bidirectional positive and negative voltage doubling rectifier circuit and a load;

wherein the booster circuit comprises a first power switching tube and an input inductor connected in series, and a first anti-parallel diode is connected in parallel to the first power switching tube;

the clamping circuit comprises a second power switching tube and a second capacitor connected in parallel, and a second anti-parallel diode is connected in parallel to the second power switching tube;

the series resonance loop comprises a leakage inductance inductor and a first capacitor; and the bidirectional positive and negative voltage doubling rectifier circuit comprises a first diode, a second diode, a third diode, a fourth diode, a first output capacitor, a second output capacitor, a third output capacitor, and a fourth output capacitor;

operating mode 1: at time $t_0$, the second power switching tube is switched off, and a current difference between the leakage inductance current $i_{Lk}$ and an input inductor current $i_{LB}$ passes through the first anti-parallel diode of the first power switching tube, the first power switching tube is switched on at zero voltage, and a current in the first anti-parallel diode of the first power switching tube is zero;

operating mode 2: at time $t_1$, a direction of a current in the first power switching tube is changed, a power supply charges the input inductor through the first power switching tube, a primary coil winding, the first capacitor and the leakage inductance inductor constitute the series resonance loop, the second diode and the third diode of an output circuit are switched on, a voltage of a secondary coil winding is converted to that of the primary coil winding as $u_o/n$, wherein n is a turns ratio of the converter, under a combined action of the voltage converted to the primary coil winding, from the secondary coil winding and a first capacitance, the leakage inductance current $i_{Lk}$ is gradually decreased to zero, and a mathematical model of the circuit under this mode is shown as Equation (1), $$\begin{bmatrix} \dfrac{di_{Lk}}{dt} \\ \dfrac{du_{C2}}{dt} \end{bmatrix} = \begin{bmatrix} 0 & -\dfrac{1}{L_k} \\ \dfrac{1}{C_2} & 0 \end{bmatrix} \begin{bmatrix} i_{Lk}(t) \\ u_{C2}(t) \end{bmatrix} + \begin{bmatrix} -\dfrac{1}{L_k} \\ -\dfrac{1}{C_2} \end{bmatrix} \begin{bmatrix} \dfrac{u_o}{n} \\ i_{LB} \end{bmatrix} \quad (1)$$

wherein $C_1$ is the first capacitor, $U_{C1}$ is a voltage at both ends of the first capacitor, $L_k$ is the leakage inductance inductor, and $u_o$ is a voltage at both ends of the load;

operating mode 3: at time $t_2$, the leakage inductance inductor and the first capacitor resonate, a direction of the leakage inductance current $i_{Lk}$ changes, a direction of a primary current changes, followed by a change in a direction of a secondary current of a transformer, such that the second diode and the third diode are switched off, and the first diode and the fourth diode are switched on, the voltage doubling rectifier circuit of the output circuit continues to charge the load, and a sum of a voltage on the first output capacitor and a voltage on the fourth output capacitor is still $u_o/n$ after being converted to the primary side, formulas for calculating the primary current and a voltage of the transformer are as follows:

$$i_{Lk}(t) = \frac{u_o/n - u_{C1}(t_0)}{\sqrt{L_k/C_1}} \sin w_r(t - t_2) \quad (2)$$

$$u_{C1}(t) = u_{C1}(t_0)\cos w_r(t - t_2) \quad (3)$$

wherein $U_{C1}$ represents a voltage of the first capacitor, $w_r$ represents a resonance frequency, $w_r = 1/\sqrt{L_k C_1}$, t represents a time variable;

operating mode 4: at time $t_3$, the leakage inductance current $i_{Lk}$ resonates to zero and the converter enters a switch-off state, wherein during this stage, the power supply keeps charging the input inductor $L_B$ such that the input inductor current $i_{LB}$ remains constant, a current in the output circuit is zero, the first diode, the second diode, the third diode and the fourth diode are switched off, the second output capacitor and the fourth output capacitor directly supply power to the load, and the leakage inductance current $i_{Lk}$ of the transformer at this stage can be obtained as:

$$i_{Lk}(t) = 0$$

wherein a sum of a voltage of a primary winding of the transformer and the voltage of the first capacitor $C_1$ is $U_N$, and a principle of volt-second balance is applied as:

$$d_1 U_1 + d_3 U_3 = d_2 U_2 \quad (5)$$

$$U_3 = \frac{d_2 U_2 - d_1 U_1}{d_3} \quad (6)$$

in the Equations, $U_1$, $U_2$ and $U_3$ are sums of the voltage of the primary winding of the transformer and the voltage of the first capacitor in mode 1, mode 2 and mode 3, respectively; $d_1$ represents a duty ratio of the DC-DC converter in operating mode 1 and operating mode 2; $d_2$ represents a duty ratio of the DC-DC converter in operating mode 3; and $d_3$ represents a duty ratio of the DC-DC converter in operating mode 4;

operating mode 5: at time $t_4$, the first power switching tube is switched off, the current difference between an input current and a transformer current flows through the second anti-parallel diode of the second power switching tube, the second capacitor is discharged, the first capacitor is charged, a current flowing through the second power switching tube changes from negative to zero, a zero-voltage-switching condition is created such that the second power switching tube is switched on at zero voltage, the second diode and the third diode are switched on, the first diode and the fourth diode are switched off, and this phase ends when the current $i_{S2}$ through the second power switching tube reaches zero; and operating mode 6: at time $t_5$, a current of the second anti-parallel diode of the second power switching tube reaches zero, a direction of the current $i_{S2}$ flowing through the second power switching tube changes, the direction of the leakage inductance current $i_{Lk}$ remains unchanged and the leakage inductance current $i_{Lk}$ increases linearly, the second diode and the third diode are switched on, during time period $t_4$-$t_6$ the input inductor current flows through the primary winding of the transformer and charges the first capacitor all the time, and a mathematical model during this time period $t_4$-$t_6$ is shown as Equation (7):

$$\begin{bmatrix} \dfrac{di_{Lk}}{dt} \\ \dfrac{du_{C2}}{dt} \end{bmatrix} = \begin{bmatrix} 0 & \dfrac{1}{L_k} \\ \dfrac{1}{C_2} & 0 \end{bmatrix} \begin{bmatrix} i_{Lk}(t) \\ u_{C2}(t) \end{bmatrix} + \begin{bmatrix} -\dfrac{1}{L_k} \\ -\dfrac{1}{C_2} \end{bmatrix} \begin{bmatrix} \dfrac{u_o}{n} \\ i_{LB} \end{bmatrix} \quad (7)$$

wherein $C_2$ is the second capacitor.

2. The high-gain quasi-resonant DC-DC converter based on the voltage doubling rectifier circuit according to claim 1, wherein when a switch-on control signal is applied to the first power switching tube, the second power switching tube is controlled to be switched off, the first anti-parallel diode is switched on, current and voltage resonance occurs in the series resonance loop, and an alternating current and voltage are generated in the primary coil winding; a first-stage voltage boost is completed on a secondary coil winding side by the transformer; at the same time, the second diode and the third diode, and the first diode and the fourth diode, in the secondary coil winding are switched on in turn during a positive half-cycle and negative half-cycle of an alternating-current (AC), so as to complete AC voltage doubling rectification on the secondary coil winding side of the transformer, and thus achieve a voltage boost on the secondary coil winding side on the basis of a voltage boost on a primary coil winding side; finally, direct current with a high voltage gain is obtained on the load, the first power switching tube is then switched on at zero voltage, the power supply charges the input inductor, and currents of other branches are zero; the third output capacitor and the fourth output capacitor maintain a load supply current; and when the switch-on control signal is applied to the second power switching tube, the first power switching tube is controlled to be switched off; first, the second anti-parallel diode is switched on, the input current charges the second capacitor through the second anti-parallel diode, when a voltage of the capacitor is higher than a voltage of the power supply, the second power switching tube is switched on at zero voltage, and the second capacitor discharges, and charges the leakage inductance inductor in series and the first capacitor to store energy for a next stage of series resonance.

3. The high-gain quasi-resonant DC-DC converter based on the voltage doubling rectifier circuit according to claim 1, wherein duty ratios of the first power switching tube and the second power switching tube are D and 1-D, respectively.

4. The high-gain quasi-resonant DC-DC converter based on the voltage doubling rectifier circuit according to claim 1, wherein a resonant capacitor is adopted as the first capacitor.

5. The high-gain quasi-resonant DC-DC converter based on the voltage doubling rectifier circuit according to claim 1, wherein the primary coil winding of the converter is N1, the secondary coil winding of the converter is N2, and the turns ratio of the converter is $n=N_2/N_1$.

* * * * *